Jan. 20, 1970     L. Z. BULLIS     3,490,422
WATER INJECTOR FOR INTERNAL COMBUSTION ENGINES
Filed May 8, 1968     2 Sheets-Sheet 1

INVENTOR
LLOYD Z. BULLIS

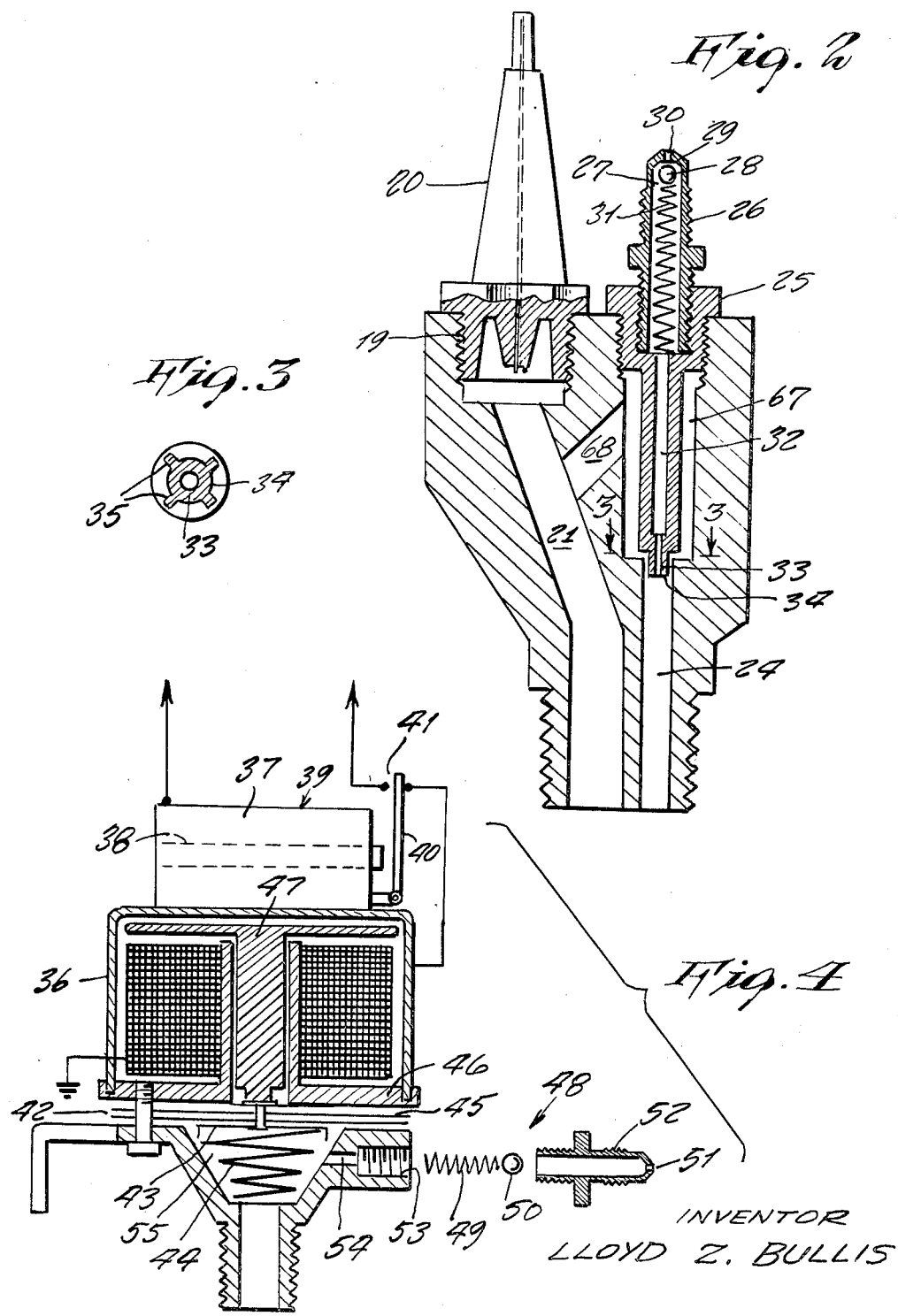

United States Patent Office 3,490,422
Patented Jan. 20, 1970

3,490,422
WATER INJECTOR FOR INTERNAL
COMBUSTION ENGINES
Lloyd Z. Bullis, 808 S. 9th St.,
Sunnyside, Wash. 98944
Filed May 8, 1968, Ser. No. 727,500
Int. Cl. F02m 43/04, 53/04; F02p 13/02
U.S. Cl. 123—25  2 Claims

ABSTRACT OF THE DISCLOSURE

A device for injecting water into the cylinder of an internal combustion engine after the combustion has taken place so as to aid in burning out the unburned gases while the piston is going down on the power stroke and coming up on the exhaust stroke.

---

This invention relates generally to internal combustion engines.

A principal object of the present invention is to provide a water injection device for the purpose of injecting a relatively small quantity of water into the cylinder of an internal combustion engine immediately after combustion has taken place so as to aid in the removal of unburned gases while the piston is going down on the power stroke and coming up on the exhaust stroke.

Another object of the present invention is to provide a water injector for internal combustion engines which is readily adaptable to most modern engines without altering the present cylinder head or manifolds.

Another object of the present invention is to provide a water injector which will not enter through the intake manifold, such as is presently done on most water injectors in use today.

Another object is to provide a water injector wherein the spark plug is moved out of extreme heat so that the points will not be burned off.

Another object is to provide a water injector wherein the water will not interfere with the idling speed of the engine, and wherein the water will add oxygen and hydrogen to the fuel after it is ignited in the cylinder of the engine.

Yet a further object is to provide a water injector which will give increased power to the engine and produce less air pollution.

Other objects of the present invention are to provide a water injector which is simple in design, inexpensive to manufacture, rugged in construction, easy to use and efficient in operation.

These and other objects will be readily evident upon a study of the following specification and the accompanying drawing wherein:

FIG. 2 is an enlarged cross sectional view of the unit mounted upon a cylinder;

FIG. 3 is a cross-sectional view taken on the lines 3—3 of FIG. 2 shown enlarged; and FIG. 4 is a cross-sectional view of the injector solenoid pump.

Figure 1:
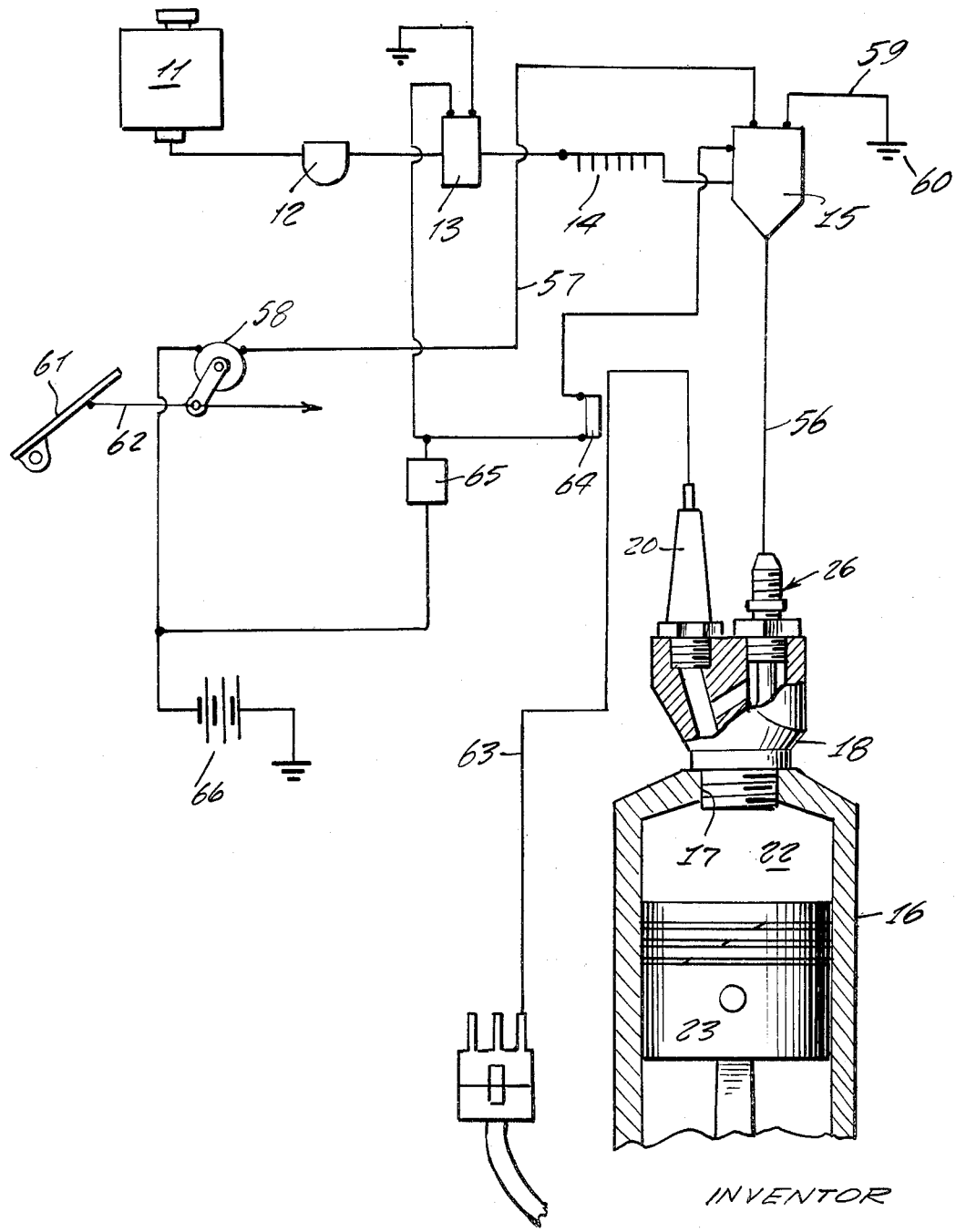
FIG. 1 is a diagrammatic circuit of the present invention.

Referring now to the drawing in detail and more particularly to FIGURE 1, the reference numeral 10 represents a water injector for internal combustion engines according to the present invention wherein there is a water supply tank 11 which is connected to one end of an outlet pipe leading to a water filter 12 which at its other end is connected to a water pump 13. The pump is connected to a water distributor 14 as shown in FIG. 1.

The opposite end of the water distributor is connected to an injector pump 15 one of which is provided for each of the cylinders.

An engine cylinder 16 is provided with a threaded opening 17 normally used for a spark plug, the opening receiving a plug adapter 18. The plug adapter, shown in detail in FIG. 2 of the drawings, includes a threaded opening 19 for receiving a spark plug 20. The opening 19 communicates with a passage 21 which communicates at its opposite end with combustion chamber 22 of the engine cylinder. A piston 23 is contained slidably within the cylinder. The passage 21 comprises an ignition tube. An injector tube 24 within the plug adapter communicates at one end with the cylinder combustion chamber 22, the opposite end of the injector tube being threaded to receive a generator 25 which is internally threaded so to receive a check valve and connector 26. The check valve and connector include a central opening 27 therethrough within which there is contained a spherical ball 28 in abutment with an end wall 29 having small openings 30 therethrough. A compression coil spring 31 bears at one end against the ball 28 so to seat it against the opening 30. A central opening 32 through the generator communicates between opening 27 of the check valve and connector and the injector tube 24 within the plug adapter. As shown in FIG. 2, a constricted passage 33 is provided at the lower end of the pasasge 32 in the generator. The tip 34 at the lower end of the generator through which the passage 33 extends is splined as shown at 35 in FIG. 3 of the drawings so as to allow air to pass out of the injector chamber, past the generator tip and out through the injector tube. This will cause a vacuum at the end of the tip 34 and will pull water and steam out of the generator or into the injector tube and into the combustion chamber as the piston goes down upon the power stroke. The check valve ball 28 and the spring 31 will be of sufficient force so as to remain closed over the opening 30 while the piston is going down on the intake stroke and will be forced open by the injector pump at the proper time. The check valve will keep the water from being forced back into the injector pump.

The injector pump 15 shown in greater detail in FIG. 4 of the drawing is shown to include a housing 36 containing electrical winding 37 around a core 38 to form a relay 39 for moving an arm 40 for closing a contact 41. The solenoid pump includes a suitable base for being mounted upon the engine. There is a diaphragm 42, a lower spring plate 43 against which a compression spring 44 bears pressure, a top pressure plate 45, a solenoid base 46 and a plunger 47. Additionally a check valve 48 comprises a part of the injector pump, the check valve including compression coil spring 49 which bears at one end against a spherical ball 50 for seating the same against opening 51 within check valve body 52. The check valve body 52 is threadingly secured within threaded opening 53 and communicates by means of passage 54 to the chamber 55 within which the compression spring 44 is located. The purpose of the check valve 48 is to keep the water from being forced back to the water pump. A water line 56 communicates between the injector pump 15 and the check valve and connector 26. The injector pump 15 is electrically connected by a connector 57 to the rheostat 58 for controlling the water injector. A connector 59 from the injector pump is connected to a ground 60. A foot throttle control 61 activates a throttle control 62 to the carburetor.

The present circuit shown in FIG. 1 further includes an ignition wire 63 connected to the spark plug 20, an ignition pump relay switch 64 in a circuit between the ignition pump and an off-on switch 65 connected to a battery 66 of the engine.

In operative use, the invention will operate in the following manner. As the piston goes down on the intake stroke, the gas will be drawn into the cylinder in the usual way. When the piston is at the bottom of the stroke, the injector pump will be energized by the proper relay switch 64 which will inject water into the injector generator 25 by the perssure that is built up caused by the piston as it comes up on a compression cycle. As the piston comes up on the compression stroke, the gas will enter the ignition tube 21 and will be forced up to the spark plug 20 for ignition. The gas will also be forced into the injector chamber 67. The injector chamber 67 is connected by a passage 68 to the ignition tube 21. Air will meet the gas at the tip 34 of the generator, this air being met by air and gas entering the injector tube from the cylinder end. This will cause a dead air space at the tip so to allow fresh gas to be moved to the spark plug points for ignition. At ignition, the fire will be forced out through the ignition tube so to ignite the gas in the combustion chamber, into the ignition chamber, and out past the injector generator tip 34, then outward through the injector tube and into the combustion chamber. The air going past the generator tip will cause a vacuum at the tip and will draw the steam and water out of the generator. It will be aided by the pressure that has been built up by the water turning to steam in the generator as the piston goes down on the power stroke, the water and steam will thus help to burn the gas. It will continue to inject water and steam as the piston goes up on the exhaust stroke or until all the water in the generator has been evaporated by the heat from the combustion of the gas in the injector chamber. As the piston goes down on the intake stroke, the cycle will be started over again.

I claim:

1. In a water injector for internal combustion engines, the combination of a water supply tank connected by an outlet pipe to a water filter, said water filter being connected to a water pump, said water pump being connected to a water distributor which in turn is connected to an injector pump upon each cylinder of said engine, each of said injector pumps being connected by a water line to a plug adaptor mounted upon said engine cylinder, said plug adaptor carrying self-contained means for injecting water into said cylinder, said plug adaptor comprising a body threadingly secured at one end within a threaded opening in the wall of said engine cylinder, said plug adaptor body communicating with the compression chamber of said engine cylinder, said body having a spark plug threadingly secured within one end of an opening comprising an ignition tube, said ignition tube extending through said body and communicating with said combustion chamber of said engine cylinder, another passageway extending through said body, said passageway comprising an injector tube, a generator threadingly mounted at one end in the second said passageway comprising said injector tube, said generator carrying a check valve and connector at one end, said check valve and connector comprising a hollow body with a compression coil spring and spherical ball contained therein for selectively closing an opening at one end of said body, said generator having a passageway therethrough which is constricted at one end to form a tip, said tip being splined upon its outer side so to allow passage of air therearound, and said ignition tube and said injector tube being interconnected by a cross-passage therebetween.

2. The combination as set forth in claim 1 wherein said injector pump comprises a housing, said housing containing a plunger therewithin, said plunger activating a suitable diaphragm adjacent one side of said housing, said diaphragm being located between said housing and a hollow base for receiving water, a compression coil spring within said base bearing against a pressure plate adjacent said diaphragm, said hollow base having an opening comprising a water outlet and an opening comprising a water inlet, a solenoid within said housing for activating said plunger, and a relay mounted upon said housing for selectively energizing said solenoid.

References Cited

UNITED STATES PATENTS

| 1,764,755 | 6/1930 | Skreen | 123—25.2 |
| 2,548,150 | 4/1951 | Fox | 123—25.5 |
| 2,551,073 | 5/1951 | Waldron | 123—25.2 |
| 2,675,788 | 4/1954 | Porter et al. | 123—25.52 |
| 2,879,753 | 3/1959 | McKinley | 123—25.2 |

MARK M. NEWMAN, Primary Examiner

D. HART, Assistant Examiner

U.S. Cl. X.R.

123—32, 169